INVENTOR.
LLOYD H. DE VAUX,
BY
Neil J. Driscoll
ATTORNEY

United States Patent Office 3,466,448
Patented Sept. 9, 1969

3,466,448
DOUBLE INJECTION PHOTODETECTOR HAVING $n^+$-p-$p^+$

Lloyd H. De Vaux, Santa Barbara, Calif., assignor to Santa Barbara Research Center, Goleta, Calif., a corporation of California Filed Mar. 11, 1968, Ser. No. 712,201
Int. Cl. H01j *39/12*
U.S. Cl. 250—211 9 Claims

ABSTRACT OF THE DISCLOSURE

The invention disclosed comprises a material of one conductive type and materials of other conductive types sandwiched in appropriate relation providing a photodetector comprising an $n^+$-p-$p^+$ structure. The $n^+$ region is created in a p-type semiconductor in InSb by any conventional technique. The p-type InSb semiconductor is considered nearly intrinsic. A $p^+$ small area contact is made on the opposite side of the semiconductor using similar techniques. In its operation situs, the photo detector is mounted on a heat sink for refrigerated cooling with the $n^+$ region in contact with the sink. Multiple photo injection results from the impingement of the infrared radiation on the detector and electrical measurement directly related to that radiation may be acquired using any one of several conventional techniques.

This invention relates to infrared radiation detection and more particularly to methods and apparatus for such detection employing double injection semiconductor devices.

Conventional infrared detectors are operated in either the photodetective or the photovoltaic modes. In the photoconductive method radiation is sensed by a change in condutivity in a semiconductor crystal or polycrystalline thin film. This change in conductivity is converted into an electrical signal by imposing a DC bias current on the photoconductor and by detecting the change in voltage across the photoconductor. In the photovoltaic mode a semiconductor containing a p-n junction is exposed to radiation which generates electrons and holes which cross the junction thereby generating a photocurrent. Photovoltaic detectors are usually operated with nearly zero DC bias to minimize the noise generated in the junction region; however, higher signal voltage output is possible through reverse biasing.

It is an object of the present invention to provide an improved infrared radiation detector.

It is another object of the present invention to provide a double injection photodetector which permits a wide range of flexibility in choosing a mode of operation.

It is a further object of the invention to provide a double injection photodetector which may be operated in any of the following modes of operation: (1) DC bias operation, (2) AC bias opertaion (3) relaxation oscillator mode, and (4) background radiation level detection mode.

It is a still further object of the invention to provide a double injection photodetector having improved detectivity and low impedance for use as a high-speed detector.

It is still a further object of the invention to provide an infrared detector which senses radiation directly in the frequency domain and which is therefore applicable to digital techniques in read-out.

These objects are accomplished according to the present invention as follows. The double injection photodetector of the present invention employs an $n^+$-p-$p^+$ structure in any of a number of photosensitive semiconductors in which the more mobile minority carrier is trapped in intrinsic or lightly-doped crystals of the opposite conductivity type. The wide variety of semiconductors which may be employed allows substantial latitude in choosing spectral response and time constant. Various geometries of the $n^+$-p-$p^+$ structure are possible. For example, the current direction can be at right angles to the direction of incident radiation or parallel thereto. The $p^+$ and $n^+$ regions can be diffused, eptiaxial, alloyed, or formed in a planar manner in the p-type semiconductor crystal. These semiconductor devices are characterized by three distinct current ranges. At low currents, the devices are nearly ohmic which forms the first current range. As the current increases, the dynamic resistance decreases and becomes negative to form the second or transition range of current. Further increase of current results in a smaller positive dynamic resistance forming the third range of current. The effect of increased infrared radiation is to increase the current for a given voltage throughout the third current region. Thus the phase of the photovoltage reverses in the transition region and the open-circuit voltage becomes large.

These characteristics of the double injection photodetector of the preesnt invention permit wide flexibility in choosing a mode of operation for the photodetector. These modes of operation will be referred to herein as the (1) DC bias mode, (2) AC bias mode, (3) relaxation oscillator mode, and (4) background radiation level detection mode.

These and other objects and advantages of the present invention will be more fully understood by reference to the following detailed description when read in conjunction with the attached drawings in which like reference numerals refer to like parts and in which.

Figure 4:
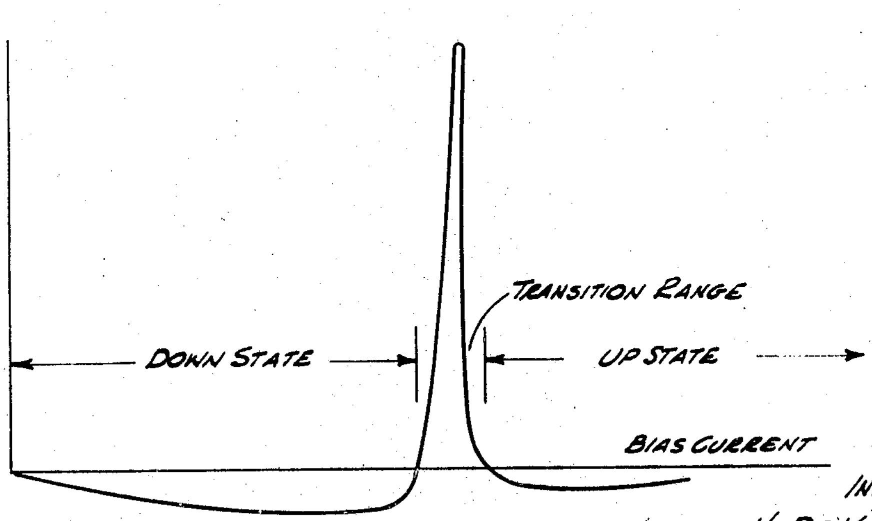
Figure 5:
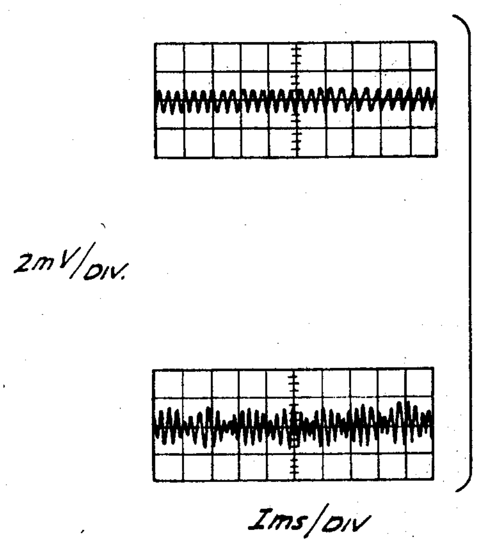
Figure 6:
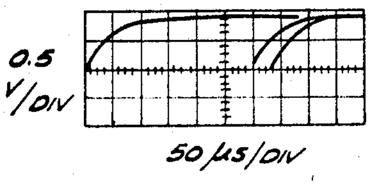
Figure 8:
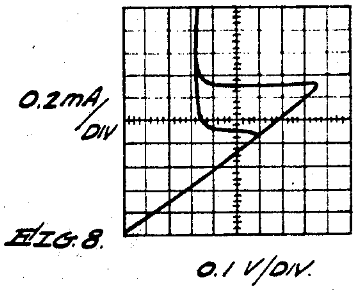
Figure 7:
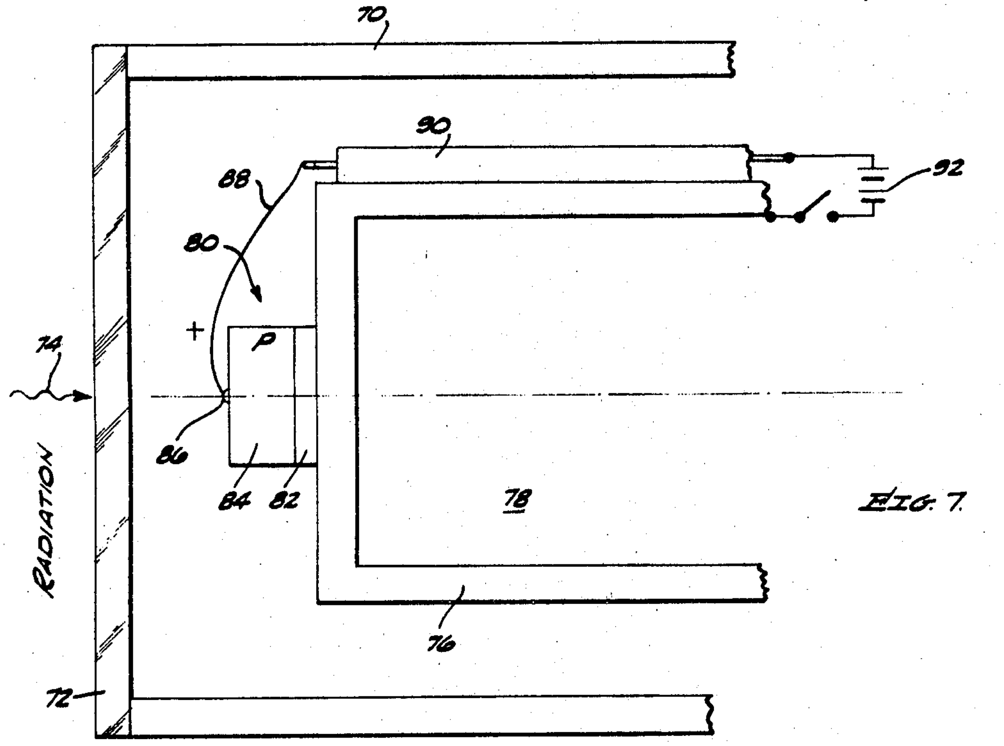
Figure 9:
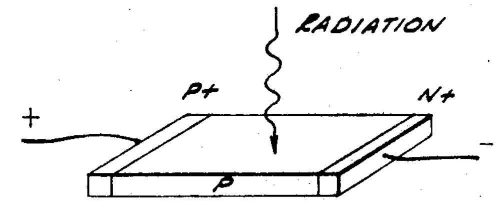
Figure 10:
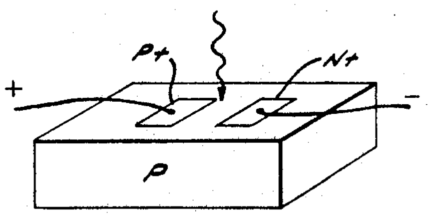
Figure 11:
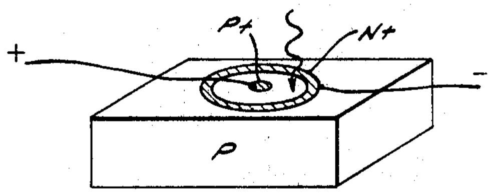
Figure 12:
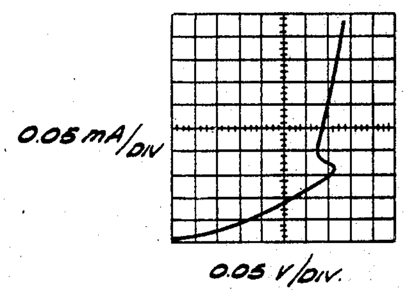

FIG. 4 illustrates graphically the responsivity vs. bias current for the DC bias mode of the double injection photodetector of the present invention, FIG. 5 illustrates graphically the optical modulation in the AC bias mode for the double injection photodetector of the present invention, FIG. 6 illustrates graphically the increase in the period of relaxation oscillation with increased IR radiation illustrating the relaxation oscillation mode for the double injection photodetector of the present invention, FIG. 7 is a cross-sectional, partly schematic view of a double injection photodetector of the invention in which the current flow is parallel to the incident radiation, FIG. 8 illustrates graphically a hysteresis effect exhibited by certain double injection photodetectors of the invention, FIG. 9 is a perspective, partly schematic view of a double injection photodetector of the invention in which the current flow is perpendicular to the incident radiation, FIG. 10 is a perspective, partly schematic view of another double injection photodetector of the invention in which the current flow is perpendicular to the incident radiation, FIG. 11 is a perspective partly schematic view of still another double injection photodetector of the invention in which the current flow is perpendicular to the incident radiation, and FIG. 12 illustrates graphically the current voltage characteristics for the double injection photodetector geometry shown in FIG. 11.

Figure 1:
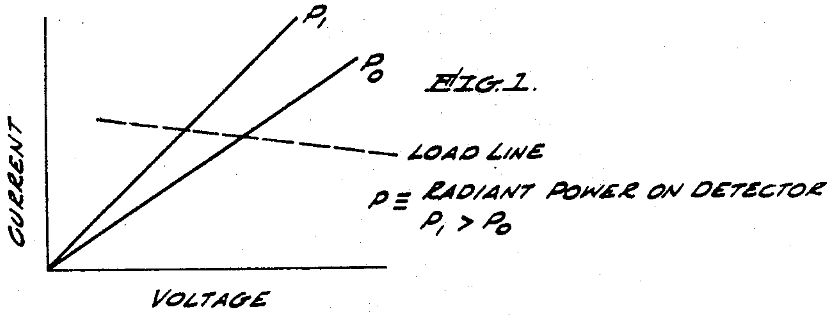
FIG. 1 illustrates graphically the photoconductive mode of operation.

FIG. 1 is illustrative of the conventional photoconductive mode of operation of infrared detectors in which the change in conductivity of a semiconductor crystal is converted into an electrical signal by imposing a DC bias current on the photoconductor.

Figure 2:
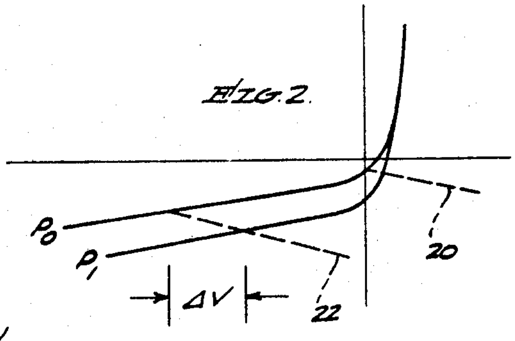
FIG. 2 illustrates graphically the photovoltaic mode of operation.

FIG. 2 is illustrative of the conventional photo-voltaic mode of operation of an infrared photodetector in which incoming radiation generates electrons and holes which cross a p-n junction in a semiconductor thereby generating a photo-current. The load line 20 illustrates the operation with nearly zero DC bias for minimizing the generation of noise in the p-n junction region. The load line 22 illustrates the use of reverse biasing to obtain higher signal voltage output.

FIGS. 1 and 2, which illustrate conventional modes of operation for infrared detector, have been illustrated in order to aid in pointing out the vast difference between the conventional operation of infrared detectors and the wide flexibility available, according to the present invention, in choosing a mode of operation for the double injection photodetector of the invention.

Figure 3:
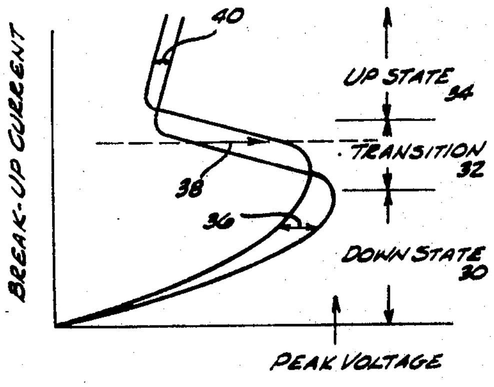
FIG. 3 illustrates graphically the double injection mode of operation.

FIG. 3 illustrates qualitatively the current-voltage curve exhibited by the double injection photo-detector of the invention. The three distinct current ranges 30, 32 and 34 discussed above are referred to as the down state region, the transition region, and the up state region. Arrows 36, 38 and 40 indicate the polarity of the open-circuit photovoltages. It is noted that the phase of the photovoltage reverses in the transititon region and the open-circuit voltage therein becomes very large compared to the open-circuit voltages in the other two regions. As the current is increased the injected plasma from the $n^+$ region approaches the other surface of the semiconductor crystal. When the injected plasma reaches the $p^+$ contact or when the electric field causes impact ionization in the region of the $p^+$ contact, the voltage falls to a lower value. Further increase in current leads to increased voltage with a lower dynamic resistance. The effect of additional radiation impinging on the photodetector is to lower the peak voltage and increase the break-up current.

The above described characteristics of the double injection photodetector of the invention permit great flexibility in choosing a mode of operation for the photodetector. In the DC bias mode of operation the photodetector is operated in a manner corresponding to the conventional mode of operation. The open-circuit responsivity varies with the DC bias current as shown qualitatively in FIG. 4. Photoconductive gains for the down state region are comparable to that of normal photoconductivity and larger output voltages are attainable in the transition region. The double injection photodetector is therefore a high-gain photo device.

Referring to FIG. 5 and the AC bias mode of operation of the double injection photodetector of the present invention, the large change in responsivity with bias current on both sides of the transition region makes AC biasing techniques especially attractive. By superimposing an AC bias current at $f_1$ on a DC bias level the incoming sinusoidal optical signal at $f_2$ results in an amplitude modulated signal as illustrated in FIG. 5. The advantage of AC biasing in this manner is that multiplexing of a number of infrared detectors can be accomplished.

With reference to FIG. 6 and the relaxation oscillator mode of operation of the double injection photodetector of the present invention, by placing a capacitor across the photodetector and employing a constant-current DC bias with the current level set above the transition region, relaxation oscillations take place. The period of the oscillation varies directly with the infrared radiation impinging on the photodetector. FIG. 6 shows the change in the period for additional radiation from an 800° K. black body. This is the first infrared photodetector which is capable of sensing radiation directly in the frequency domain. The fourth mode of operation, i.e., the background radiation level detection mode, operates as follows: By setting the bias current of the detector above the transition region, increased background radiation will increase the transition current and at a particular value will result in an increase in DC voltage across the photodetector. Alternatively by using a capacitor, increased background radiation will cause the photodetector to cease relaxation oscillations. In either case the device can be used to sense the level of steady radiation by proper adjustment to bias current.

A preferred embodiment of the present invention will now be described by reference to FIG. 7 and to the following specific example. FIG. 7 shows an evacuated housing 70 provided with a transparent window 72 at one end thereof. The window 72 is transparent to the infrared radiation, indicated by the arrow 74, employed in this example. Centrally mounted within the housing 70 is a heat sink 76 which contains a coolant reservoir 78 (which in this example is liquid nitrogen), a double injection photodetector 80 made according to the present invention is mounted on the heat sink 76 and positioned for exposure to the infrared radiation 74. The photodetector 80 consists of an $n^+$-p-$p^+$ structure which is constructed as follows. The $n^+$ region 82 is created in a p-type or nearly intrinsic semiconductor 84 of InSb by diffusion techniques (alloying and epitaxy have also been used) and a $p^+$ or ohmic small area contact 86 was made to the opposite side of the semiconductor 84 by similar techniques. The photodetector 80 is mounted on the heat sink 76 with the $n^+$ region in contact with the heat sink 76 which provides one of the two electrical contacts to the photodetector 80. The photodetector 80 may be suitably biased by connecting the electrode 88 to the $p^+$ contact and insulating sheath 90 after the electrode 88 was mounted on the heat sink 76. A voltage source 92 is connected between the electrode 88 and the heat sink 76 to provide the biasing as schematically shown in FIG. 7. In operation, electrons are injected from the $n^+$ region 82 into the p-type or nearly intrinsic region 84. Since the injected electrons are trapped (as they are in case of p-type InSb at 77° K.) additional electrons injected have a longer lifetime when the traps are filled. As a result a long diffusion length for additional projected electrons is produced. This effect is enhanced by the large electron-to-hole mobility ratio. The $p^+$ or ohmic contact does not cause appreciable injection into the p-type region 84; however, the small size of the contact 86 results in spreading resistance. This spreading resistance is not necessary for the negative resistance effect. As the current is increased the injected plasma approaches the upper surface of the semi-conductor crystal 84. When it reaches the top contact 86 or when the electric field causes impact ionization in the region of the top contact 86, the voltage falls to a lower value. Further increase in current leads to increased voltage with a lower dynamic resistance. The effect of additional radiation impinging on the photodetector 80 is to lower the peak voltage (see FIG. 3) and to increase the break-up current. It is believed that this specific embodiment of the invention, namely the $p^+$-p-$n^+$ InSb photodetector operating at liquid nitrogen temperatures represents a new and more versatile method of infrared detection for wavelengths to around 5.6 microns. The device has good detectivity and low impedance, therefore high-speed detectors can be designed using the same general principle through adjustment of semiconductor parameters.

With reference to FIG. 8 some double injection photodetector devices made according to the present invention, depending on semiconductor parameters exhibits a hysteresis effect which is illustrated in FIG. 8. This hysteresis is not deleterious for operation in the frequency domain or as a level detector but can be bothersome if the ordinary DC bias mode of operation is employed.

FIGS. 9, 10 and 11 illustrate other geometries for the double injection photodetector of the present invention which can be used. These geometries, as shown in FIGS. 9, 10 and 11, are positioned for use with the direction of incident radiation being at right angles to the current direction. The $p^+$ and $n^+$ regions can be diffused, epitaxial, or alloyed to the ends of a semiconductor crystal, such as p-type InSb, or they may be formed in a planar manner as shown in FIGS. 10 and 11. For the geometries shown in FIGS. 9, 10 and 11 negative resistance occurs, no hysteresis is observed in the current-voltage characteristic and polarity reversal in the photo-voltage takes place. The geometries shown in FIGS, 9, 10 and 11 have been successfully operated, for example, in the relaxation oscillation mode of operation.

FIG. 12 illustrates graphically the current-voltage characteristics for the double injection photo-detector geometry shown in FIG. 11.

In summary, it will be apparent that it will be understood that a $p^+$-p-$n^+$ InSb detector disclosed and its equivalents operating at liquid nitrogen temperatures represents a novel and unique structure for detection of infrared radiation particularly for wavelengths to 5.6 microns. The device is characterized by excellent detectivity, low impedance and fast reaction.

The invention disclosed is by way of illustration and not limitation and may be modified all within the scope of the appended claims.

What is claimed is:

1. A photodetector device for detecting infrared radiation comprising a first region of nearly intrinsic semiconductor material, a positive n region existent in one area of the first region, a positive p region existent in another area of said first region, an infrared radiation source of continuously varying intensity, electrodes connected to said n and p regions, said electrodes being adapted for connection to external circuitry, and means associated with said external circuitry for registering electrical changes in the device in response to the variation in intensity of radiation from said source impinging on the device.

2. A photodetector device for detecting infrared radiation according to claim 1, wherein said first region has the n and p regions on different edges thereof.

3. A photodetector device for detecting infrared radiation according to claim 1, wherein said first region has the n and p regions on one surface thereof.

4. A photodetector device for detecting infrared radiation according to claim 3, wherein the n and p regions are in generally side-by-side spaced relation.

5. A photodetector device for detecting infrared radiation according to claim 3, wherein the n and p regions are in spaced generally annular relation to each other.

6. A photodetector device for detecting infrared radiation according to claim 1, and including a heat sink and a coolant reservoir in conductive heat transfer relation with the n region.

7. A photodetector device for detecting infrared radiation according to claim 1, wherein the nearly intrinsic semiconductor material is indium-antimony.

8. A photodetector device for detecting infrared radiation according to claim 7, and including a heat sink and cold coolant reservoir in conductive heat transfer relation with the n region.

9. A photodetector device for detecting infrared radiation according to claim 8, wherein the device has a high degree of spectral response up to 5.6 micron wavelengths of infrared radiation.

References Cited

UNITED STATES PATENTS

| | | | |
|---|---|---|---|
| 3,092,725 | 6/1963 | Grimmeiss et al. | 250—211 |
| 3,366,793 | 1/1968 | Svedberg | 317—235 |
| 3,389,267 | 6/1968 | Aconsky | 317—235 |

RALPH G. NILSON, Primary Examiner

MARTIN ABRAMSON, Assistant Examiner

U.S. Cl. X.R.

250—833; 317—235